May 22, 1956
C. A. HOFF
2,746,726
SPACE HEATER FOR BUSSES AND THE LIKE
Filed Dec. 18, 1953
2 Sheets-Sheet 1
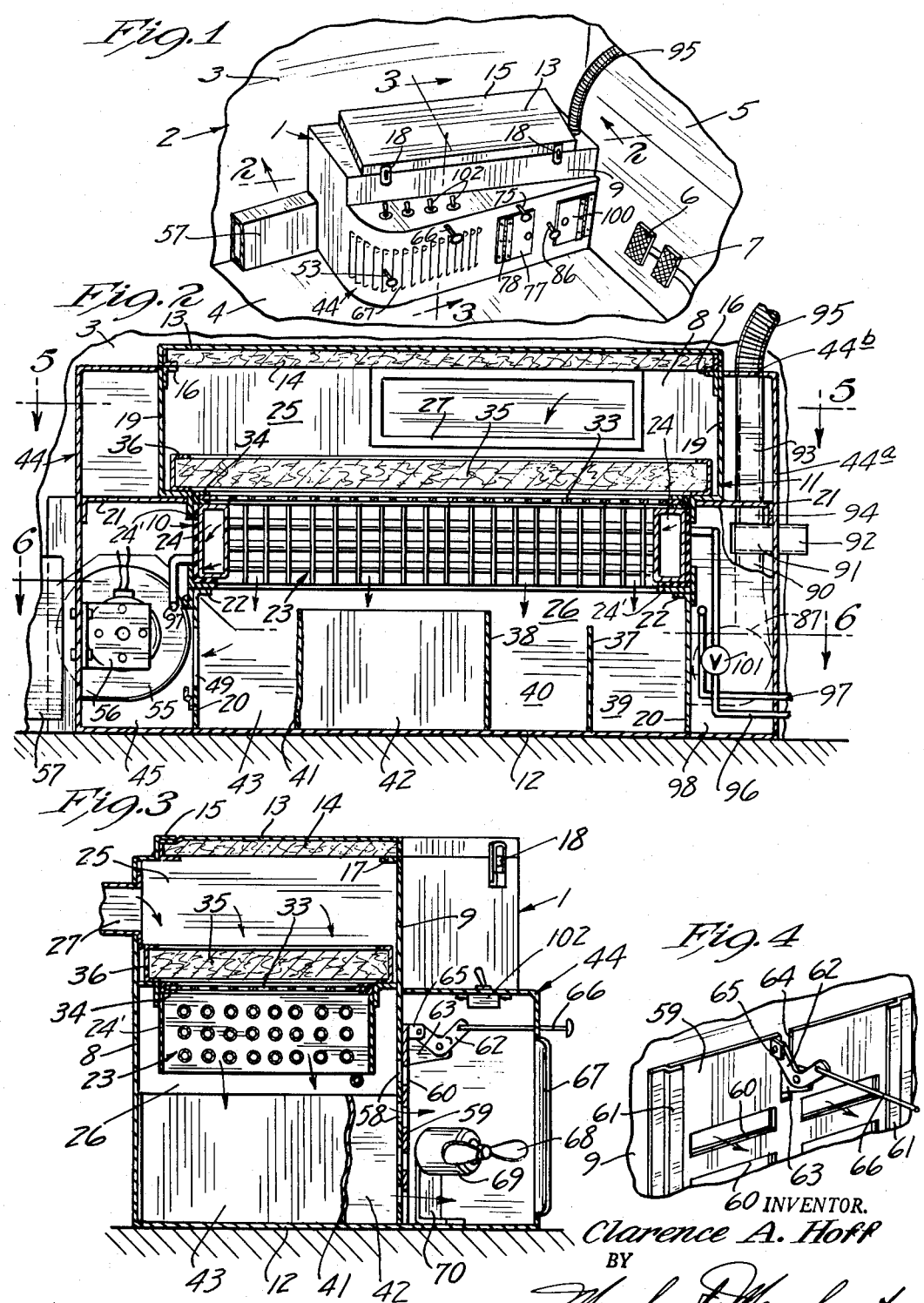
INVENTOR.
Clarence A. Hoff
BY
Merchant & Merchant
ATTORNEYS

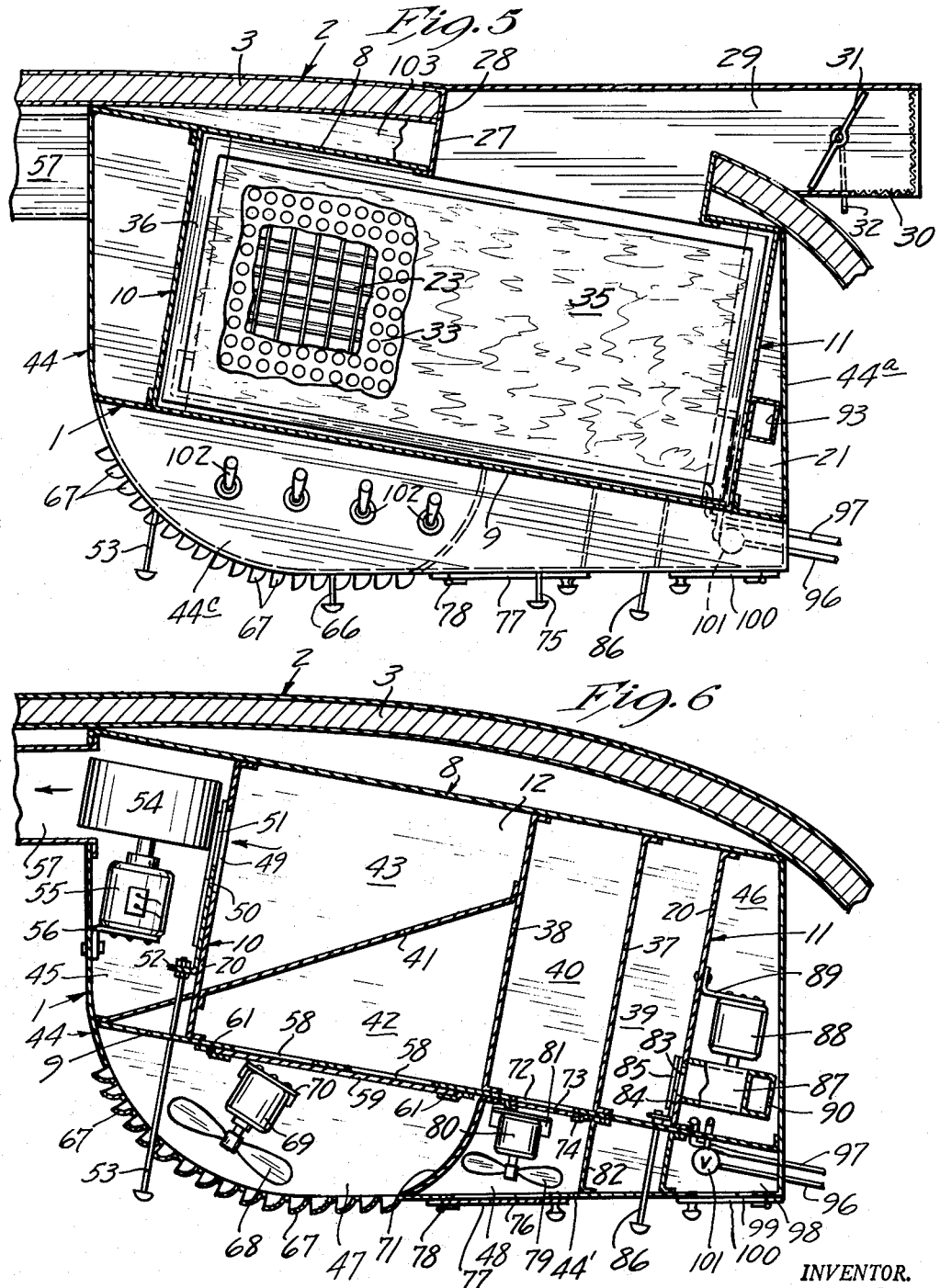

United States Patent Office 2,746,726
Patented May 22, 1956

2,746,726

SPACE HEATER FOR BUSSES AND THE LIKE

Clarence A. Hoff, Milan, Minn.

Application December 18, 1953, Serial No. 399,038

4 Claims. (Cl. 257—137)

My invention relates generally to space heaters and more particularly to such heaters particularly adapted for use in heating the interiors of large vehicles such as busses and the like.

An important object of my invention is the provision of a space heater of the above type having novel means for distributing heated air in a highly efficient manner to all parts of the interior of the vehicle.

Another important object of my invention is the provision of novel means whereby the heated air may be selectively directed toward some parts of the vehicle interior and the delivery thereof cut off from other parts of the vehicle interior.

Another object of my invention is the provision of a space heater utilizing a radiator and having novel means whereby the entire area of the radiator is utilized regardless of the volume of air flowing therethrough.

Still another object of my invention is the provision of a space heater as set forth which is relatively simple and inexpensive to manufacture, which may be installed in a bus or in a vehicle with a minimum of time and expense, which is highly efficient in operation and durable in use.

Another object of my invention is the provision of a space heater as set forth having a removable air filter, and of novel means whereby said filter may be readily removed for cleaning or replacement.

The above and still further highly important objects and advantages of my invention will become apparent from the following detailed specification, appended claims and attached drawings.

Referring to the drawings, which illustrate the invention, and in which like characters indicate like parts throughout the several views:

Fig. 1 is a fragmentary view in perspective showing my novel space heater mounted in a conventional motor bus or like vehicle;

Fig. 2 is a longitudinal sectional view taken substantially on the line 2—2 of Fig. 1 on an enlarged scale;

Fig. 3 is an enlarged transverse section taken substantially on the line 3—3 of Fig. 1;

Fig. 4 is an enlarged fragmentary view in perspective of one of the air flow regulating devices of my invention;

Fig. 5 is an enlarged horizontal section taken substantially on a plane indicated by the line 5—5 of Fig. 2; and Fig. 6 is an enlarged fragmentary section taken substantially on a plane indicated by the line 6—6 of Fig. 2.

In the preferred embodiment of the invention illustrated a space heater built in accordance with my invention is indicated in its entirety by the numeral 1 and is shown in Fig. 1, as being situated in the interior left front corner of a motor bus body 2. The side wall of the bus body 2 is indicated at 3, the floor thereof at 4, and the fire wall or dashboard being indicated at 5. Conventional clutch and brake pedals 6 and 7 respectively for controlling the vehicle are also shown in Fig. 1.

The space heater 1 includes a housing having opposed side walls 8 and 9, opposed end walls 10 and 11 and a bottom wall 12. The open top of the housing is normally closed by a cover 13 which, like the housing walls, is preferably made from sheet metal, and which is lined with heat insulating material indicated at 14. One longitudinal edge portion of the cover 13 is held against upward movement by an inturned flange 15 formed at the upper edge of the side wall 8. The opposite ends of the cover 13 rest upon supporting flanges 16 at the upper ends of the end walls 10 and 11. The opposite longitudinal edge of the cover 13 rests upon an inturned flange 17 integrally formed with and defining the upper end of the side wall 9. The cover 13 is normally locked in place by a pair of conventional releasable fasteners 18, see Figs. 1 and 3.

With reference particularly to Fig. 2 it will be seen that the end walls 10 and 11 comprise upper and lower wall sections 19 and 20 respectively the former of which rests upon a horizontal partition 21 and the latter of which rest upon the bottom wall 12. Mounted on the inturned upper edges 22 of the lower end wall sections 20 is a conventional tube and fin radiator 23 which is generally rectangular in form, which is horizontally disposed within the housing, and which includes headers 24 at its opposite ends. The radiator 23 is mounted substantially centrally between the bottom wall 12 and the removable cover 13 and divides the interior of the housing into upper and lower chambers 25 and 26 respectively, the former of which is in the nature of an expansion or equalizing chamber and the latter of which will be hereinafter referred to as a plenum chamber. Fresh air is admitted to the equalizing chamber 25 through a cross sectionally rectangular air inlet tube 27 which projects laterally outwardly from the side wall 8 of the housing and through an opening 28 in the side wall 3 of the bus body 2. The inlet tube 27 is connected to an intake head 29 which projects slightly forwardly of the front end portion of the vehicle side wall 3, and which at its front end is provided with a screened inlet opening 30. A control damper or valve element 31 is mounted in the intake head 29, as shown in Fig. 5, to regulate the flow of air from the exterior of the bus to the equalizing or expansion chamber 25 through the conduit 27. Any suitable means for operating the valve 31 such as a control rod 32, may be utilized as desired.

For diffusing the air in a manner to cause the same to move uniformly through the entire area of the radiator 23, I provide suitable equalizing means such as a screen or perforate plate 33 which is generally rectangular in form and which is mounted in overlying relationship to the radiator 23. The plate 33 is provided at its marginal edges with a cross sectionally U-shaped border element 34 which is preferably made of rubber, felt or the like. As shown, the plate 33 rests upon the upper surface of the radiator 23 and the headers 24 thereof. Overlying the plate 33 is a conventional air filter 35 which is preferably made from spun glass fibers or other suitable filtering media enclosed by a generally rectangular marginal frame 36. Preferably, the filter element 35 is of a size to be readily removed and replaced through the open upper end of the housing when the cover 13 is removed therefrom. With reference particularly to Figs. 2 and 3, it will be seen that the filter element 35 is located below the air inlet tube 27 so that all of the air flowing through the radiator 23 must pass through the filter 35 and the diffuser or equalizer plate 33. Actually, the filter 35 aids the equalizer plate 33 in diffusing the air flow, so that the same tends to flow equally downwardly through the entire area of the radiator 23.

With reference particularly to Figs. 2, 3 and 6 it will be seen that the plenum chamber 26 below the radiator 23 is divided into several interconnecting compartments, the bottom housing wall 12 and the bottom surface of the radiator 23 forming opposed wall elements common to all of said compartments. A pair of partitions 37 and 38 extend laterally across the plenum chamber 26 and have their opposite ends rigidly secured to the side walls 8 and 9 of the housing. The partition 37 and the adjacent housing wall 11 define opposite side walls of a compartment 39 whereas the partitions 37 and 38 define the opposite side walls of an adjacent compartment 40. An angularly disposed partition 41 has its opposite ends welded or otherwise secured to the partition 38 and the housing end wall 10, and divides the remaining portion of the plenum chamber 26 into compartments 42 and 43. With reference to Figs. 2 and 3 it will be seen that the several partitions 37, 38 and 41 extend from the bottom housing wall 12 upwardly toward the radiator 23. Also it will be seen that the upper edges of said partitions are in downwardly spaced relation to the radiator 23, the spacing between the radiator and the upper edge of the partition 37 being slightly greater than that between the radiator 23 and the upper longitudinal edges of the partitions 38 and 41. With this arrangement, all of the several compartments 39, 40, 42 and 43 are interconnected for a purpose which will hereinafter become apparent.

The housing is partially encompassed by a shell-like portion 44 which defines a pair of air transfer chambers 45 and 46 adjacent the end walls 10 and 11 respectively. The shell-like portion 44 further cooperates with the side wall 9 of the housing to define a relatively large air transfer chamber 47 and a small transfer chamber 48. An air outlet 49 in the lower wall section 20 of the end wall 10 permits flow of air from the compartment 43 into the transfer chamber 45. Said outlet opening 49 is adapted to be closed by a closure plate 50 that is slidable in spaced guide channels 51, one of which is shown. The one end of the closure element 50 is formed to provide an ear 52 to which is anchored one end of a control rod 53 which extends outwardly through the side wall 9 of the housing and the shell portion 44. Manipulation of the control rod 53 closes or opens the closure element 50 to permit the desired volume of air flow from the compartment 43 into the transfer chamber 45. A conventional fan or blower 54 is mounted in the chamber 45 and is driven by an electric motor 55 anchored in the transfer chamber 45 by a bracket 56. The fan or blower 54 is operative to deliver air from the plenum chamber 26 to a selected area in the vehicle through a conduit or duct 57. Although the duct 57 is shown but fragmentarily, it may be assumed that the same will extend to a point at or near the rear end of the vehicle body.

The portion of the housing wall 9 defining one wall of the compartment 42 is provided with a plurality of slots 58 arranged in vertical rows, see particularly Figs. 3, 4 and 6. A closure element 59 is perforated with like rows of slots 60, and is mounted for vertical sliding movements with respect to the housing wall 9 in a pair of opposed channels 61 between extreme positions wherein the slots 60 are completely in and completely out of register with their cooperating slots 58. Means for moving the closure member 59 between said extreme positions comprise a bell crank 62 pivotally secured at its central portion to a bracket 63 which is rigidly secured to the housing wall 9 and which extends outwardly through an elongated notch 64 in the closure element 59. One end of the bell crank 62 is pivotally secured to an ear 65 projecting laterally outwardly from the closure element 59. A handle-equipped control rod 66 is pivotally secured to the opposite end of the bell crank 62 and extends outwardly through an opening in the shell portion 44, see Figs. 1 and 3. The portion of the shell 44 which defines the outer wall of the air transfer chamber 47 is formed to provide a plurality of louvers 67 which are disposed in a manner to direct the air flow from the plenum chamber and the compartment 42 thereof laterally outwardly and rearwardly of the vehicle body, preferably down the central aisle thereof. To promote this flow of air through the louvers 67 I provide a fan 68 mounted on the shaft of a motor 69 that is supported from the underlying bottom wall 12 of the housing by a bracket 70. It will be noted by reference to Fig. 6 that the air transfer chamber 47 is separated from the air chamber 48 by a relatively short partition 71.

The portion of the housing wall 9 between the compartment 40 and the transfer chamber 48 is provided with an air outlet opening 72 which is adapted to be closed by a closure element in the nature of a sliding gate 73 mounted for sliding movements in channel elements 74 in the same manner as the closure members 50 and 59. A control rod 75 shown in Figs. 1 and 5 may be assumed to be connected to the closure element 73 by a bell crank mechanism not shown but similar to that operatively associated with the closure element 58. The side wall of the shell portion 44 indicated at 44' defines one wall of the air transfer chamber 48 and is provided with an opening 76 which is normally closed by a hinged door 77 that is hinged to the wall portion 44' as indicated at 78. When the closure element 73 and the door 77 are in their open positions, air will flow outwardly through the outlet openings 72 and 76 across the front end of the vehicle body whereby to supply heated air to the operator of the vehicle and to persons seated adjacent the door of the vehicle, which door is usually in the right wall of the vehicle adjacent the front end thereof. The door 77 may be opened to any extent to direct the stream of air diagonally toward the front wall of the vehicle or laterally across the vehicle as desired. A fan 79 is secured to the shaft of a suitable motor 80 mounted within the transfer chamber 48 on a suitable bracket 81. A relatively short partition 82 defines one side wall of the transfer chamber 48.

An outlet opening 83 in the wall section 20 of the housing end wall 11 is provided with a closure element 84 slidable in a guide member 85 and controlled by a handle-equipped control rod 86 extending laterally outwardly through the housing side wall 9 and the shell portion 44, see Figs. 1, 5 and 6. The outlet opening 83 communicates with a fan or blower 87 mounted on the shaft of a motor 88 rigidly mounted in the air transfer chamber 46 by means of a bracket 89 bolted or otherwise rigidly secured to the adjacent wall section 20. The blower 87 includes a fan housing or the like 90 which extends upwardly within the chamber 46 to a T-fitting 91 which has one portion 92 extending forwardly through the front end 44a. A duct or conduit 93 extends downwardly through the partition 21 and is coupled at its lower end to another branch 94 of the T 91. The upper end of the conduit 93 extends through the top portion 44b of the shell 44 and is connected to a flexible tube 95 which is adapted to be connected to the usual defroster outlets associated with the windshield of the motor vehicle. It will be appreciated that the flexible conduit 95 is selectively connected to the upper end of the conduit 93 or to the outlet 92 of the T-fitting 91 depending on the defroster outlet arrangement existing in the vehicle in which may space heater is to be installed. In some instances, it will be more convenient to use the duct 93. In this case, the outlet 92 will be closed by a suitable closure element not shown. If only the outlet 92 is used, then of course the upper end of the duct 93 would be sealed off. In still other cases, it is possible that both the outlet 92 and the duct 93 would be used simultaneously.

The radiator 23 is preferably of the type which is connected to the cooling system of the vehicle engine and is provided with an inlet pipe 96 leading to one of the headers 24 and a return pipe 97 connected to the header 24 at the opposite end of the radiator 23. The pipes 96 and 97 may be assumed to be connected to the cooling system of the vehicle engine not shown. Said pipes 96 and 97 pass through a relatively small compartment 98 in the housing structure, an outer wall of said compartment having an opening 99 therein which is normally closed by a door 100. A control valve 101 for controlling the flow of hot water to the radiator 23 is disposed within the chamber 98 within easy reach of the operator through the opening 99 when the door 100 is open. The several fan motors 55, 69, 80 and 88 are preferably controlled by manually operated switches 102 that are mounted in a horizontally disposed shelf-like portion 44c of the shell 44, see Figs. 1, 3 and 4. Said switches 102 are connected in conventional circuits with their respective motors. Inasmuch as the circuits themselves do not comprise the instant invention, the same are not shown nor described.

In the operation of my novel space heater, air from the exterior of the vehicle is drawn in through the head 29 and inlet tube 27 to the expansion or equalizing chamber 25 from whence it passes downwardly through the filter 35, equalizing screen 33, and the radiator 23 to the plenum chamber 26. Assuming that all of the outlet openings 49, 58, 73 and 83 and the door 77 are open, the heated air from the plenum chamber 26 will flow outwardly through the conduit 57, the louvers 67, the door opening 76 and the defroster tube 95 to various of the vehicle interior. This flow of air is enhanced by operation of the various fans and blowers in the several air transfer chambers, particularly when the vehicle is stationary or moving at a relatively slow speed. Of course, if one or more of the fans are rendered inoperative or if one or more of the air outlets from the plenum chamber 26 are closed, all of the air passing through the heater will flow outwardly through those which remain open and I have found that by having the several partitions 37, 38 and 41 of less height than the height of the plenum chamber 26, air flows downwardly through the entire area of the radiator 23 even when but a single one of the closure members to the several outlet openings from the plenum chamber is open. This feature of my invention together with the action of the equalizer plate 33, insures against air flowing downwardly through only a restricted area of the radiator 23 thus effectively preventing inefficient operation of the heater at all times. When all or most of the outlets are open and the blowers or fans associated therewith are in operation, the various partitions in the plenum chamber 26 aid in supplying all of the operating fans or blowers with a sufficient volume of air so that delivery thereof to the desired area in the bus or in the vehicle body retains its full effectiveness. Thus the larger and more powerful blowers 54 and 68 do not tend to starve out the relatively smaller blowers 79 and 87 when all thereof are in simultaneous operation. Although this is not a problem in mild weather when the full capacity of the heater is not required, the problem does arise under extreme cold weather conditions when the heater must be operated to a degree approaching its full capacity.

Inasmuch as a great many modern bus bodies have side walls that curve inwardly at their front ends, I have found that the appearance of my novel space heater is materially enhanced by the addition of a contour plate 103 which is fragmentarily shown in Fig. 5 and which is disposed at or near the upper end of the heater preferably above the level of the intake tube 27. This contour plate 103 besides adding to the neat appearance of my space heater also prevents coins or other objects from being dropped between the side wall 8 of the heater and the adjacent vehicle wall 3 from whence removal thereof would otherwise be very difficult. The heater housing, partitions and shell are preferably made from sheet metal, the other parts thereof being made from conventional materials. With reference particularly to Fig. 2 it will be seen that a layer of insulating material 24' is interposed between the radiator 23 and the mounting means therefor. This insulating material may be of any suitable material such as rubber, felt or the like. The insulation 24' serves not only to cushion the radiator 23 against vibration of the vehicle, but also prevents leakage of air around the sides and ends of the radiator from the equalizing chamber 25 to the plenum chamber 26. This arrangement insures passage of all of the air through the radiator 23, so that all of the air entering the vehicle through my novel space heater will be heated.

While I have shown and described a commercial embodiment of my novel space heater, it will be understood that the same is capable of modification without departure from the spirit and scope of the invention as defined in the claims.

What I claim is:

1. In a space heater for busses and the like, a housing comprising opposed side walls, end walls, and a bottom wall, said housing being adapted to rest upon the floor within the body of a vehicle adjacent one side wall thereof, a removable cover normally closing the open top of said housing, a normally horizontally disposed radiator mounted in said housing intermediate the bottom wall and cover and dividing the interior of the housing into an equalizing chamber above the radiator and a plenum chamber therebelow, means defining an air inlet to said equalizing chamber, said means comprising an air conduit extending in a direction to project through the adjacent side wall of the vehicle for the delivery of air to the interior of the vehicle to said equalizing chamber, a plurality of partition elements dividing the plenum chamber into a plurality of compartments, said radiator and bottom wall defining opposed wall elements each common to all of said compartments, said housing further defining a plurality of air outlets one for each of said compartments, and independent closure elements for each of said outlets, said partition elements each having one edge engaging said bottom wall, the opposite edge of each of said partition elements being downwardly spaced from the radiator, whereby, when only one of the closure elements is open, air moving outwardly therethrough will be drawn from all of the compartments and through the entire area of the radiator.

2. The structure defined in claim 1 in which said housing defines a plurality of air transfer chambers each communicating with a different one of said compartments through its respective outlet, and in further combination with independent power operated fans in each of said transfer chambers, and means for guiding the flow of air from said fans in different predetermined directions.

3. The structure defined in claim 1 in further combination with an equalizer plate overlying said radiator within said equalizer chamber and a removable air filter overlying said equalizer plate and disposed below the level of said inlet.

4. In a space heater for buses and the like, a housing comprising opposed side walls, end walls, and a bottom wall, said housing being adapted to rest upon the floor within the body of a vehicle adjacent one side wall thereof, a removable cover normally closing the open top of said housing, a normally horizontally disposed radiator mounted in said housing intermediate the bottom wall and cover and dividing the interior of the housing into an equalizing chamber above the radiator and a plenum chamber therebelow, a filter element in said equalizing chamber overlying said radiator, said filter element being of a size to be removed through the open top of the housing when said cover is displaced, means defining an air inlet to said equalizing chamber above the level of said filter element, said means comprising an air conduit extending in a direction to project through the adjacent side wall of the vehicle for the delivery of air to the interior of the vehicle to said equalizing chamber, a plurality of partition elements dividing the plenum chamber into a plurality of compartments, said radiator and bottom wall defining opposed wall elements each common to all of said compartments, said housing further defining a plurality of air outlets one for each of said compartments, independent closure elements for each of said outlets, said partition elements each having one edge engaging said bottom wall, the opposite edge of each of said partition elements being downwardly spaced from the radiator, partition means cooperating with a portion of said housing to define a plurality of transfer chambers each communicating with an adjacent one of said compartments when the closure elements therefor are open, independent power operated fans one in each of said transfer chambers, and means for guiding the flow of heated air from said fans in different directions, opening of but a single one of said closure elements permitting air moving outwardly therethrough to be drawn from all of the compartments and through the entire area of the radiator.

References Cited in the file of this patent

UNITED STATES PATENTS

| | | |
|---|---|---|
| 1,965,229 | Galson | July 3, 1934 |
| 2,382,712 | Hans | Aug. 14, 1945 |
| 2,655,092 | Spooner | Oct. 13, 1953 |
| 2,718,186 | Lintern | Sept. 20, 1955 |